United States Patent
Wagner, deceased

[15] 3,689,189
[45] Sept. 5, 1972

[54] SCREW FOR AN EXTRUDING DEVICE AND A DEVICE INCLUDING SAID SCREW

[72] Inventor: Claude Julien Rene Wagner, deceased, late of Pont-A-Mousson, France by Paulette Marie Josephine Wagner, administratrix

[73] Assignee: Sidel, Le Havre, France

[22] Filed: Dec. 10, 1970

[21] Appl. No.: 96,732

[52] U.S. Cl. .................................. 425/376, 259/191
[51] Int. Cl. .............................................. B29f 3/01
[58] Field of Search......425/376, 200, 205, 207, 208, 425/461

[56] References Cited

UNITED STATES PATENTS 3,280,239 10/1966 Ninneman ............. 425/376 X
3,577,589 5/1971 Serrano ................. 425/378 X
2,994,105 8/1961 Seal et al. .............. 425/376 X

*Primary Examiner*—J. Spencer Overholser
*Assistant Examiner*—David S. Safran
*Attorney*—John Lezdey and Marks & Clerk

[57] ABSTRACT

Screw for a plate-type extruder. The screw comprises at least one screwthread which starts, at the root of the screwthread, in the form of an arcuate spade portion and has in a portion of the screwthread adjacent the spade portion a cross-sectional shape having a concave crest. The root of the screwthread has a conventional cross-sectional shape having a crest parallel to the axis of the screw.

5 Claims, 8 Drawing Figures

PATENTED SEP 5 1972
3,689,189
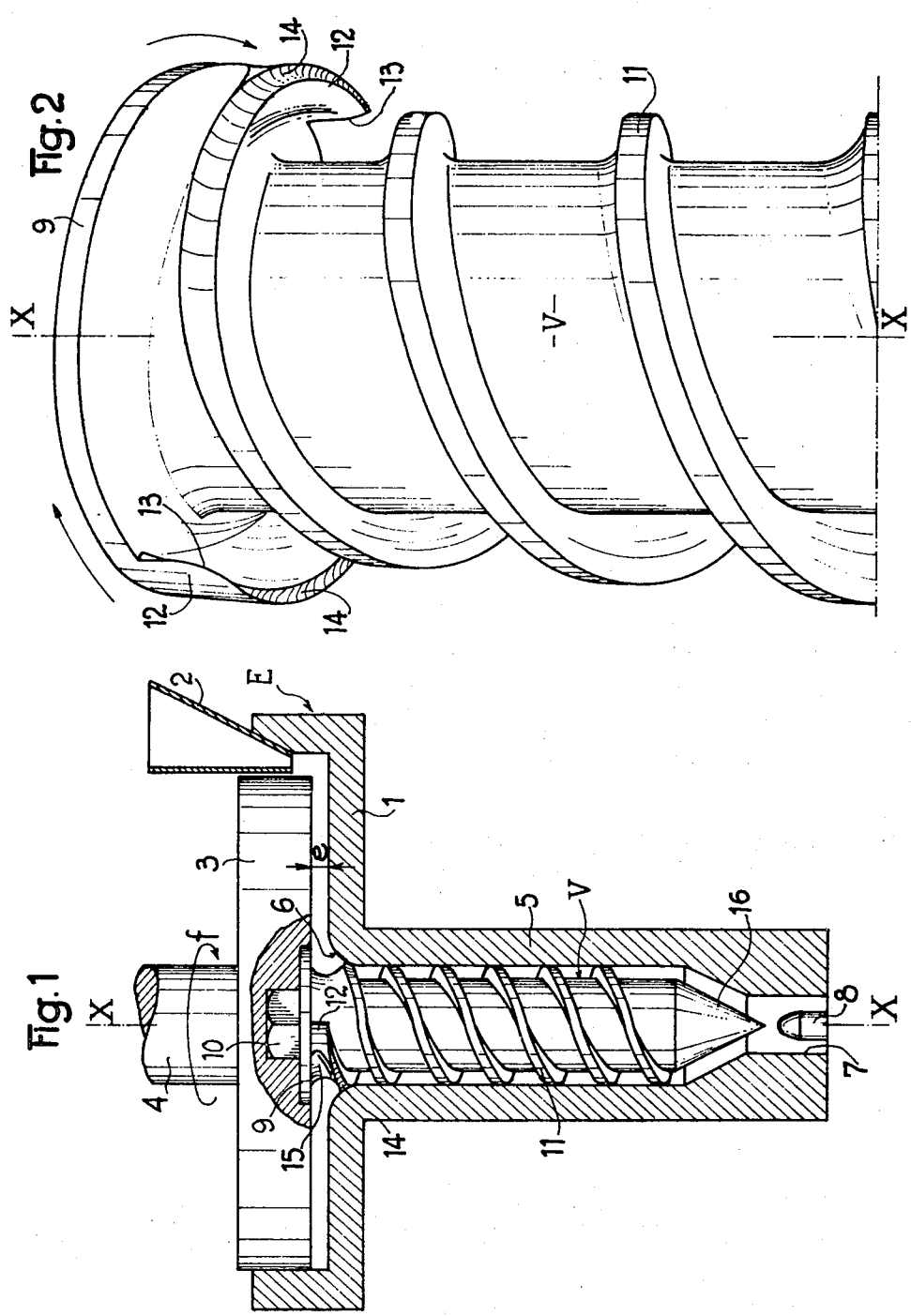

SCREW FOR AN EXTRUDING DEVICE AND A DEVICE INCLUDING SAID SCREW

The present invention relates to plate-type extruders for extruding plastics materials and elastomers in general and to screws for conveying and compressing gelled materials issuing from the extruder so as to eject them under pressure through an orifice of an extruding or shaping die. More particularly, the invention relates to a screw mounted in the axial extension of a plate-type extruder, said screw being provided with screwthreads defining helical grooves which communicate with a space between the plates or airgap for receiving the gelled material in the axial zone of the extruder and conveying it to the outlet die at a pressure sufficient for production on an industrial scale.

It is known that a plate-type extruder, or extruder employing a shear effect, converts a plastics material, such as rigid polyvinyl chloride in the form of powder or grains, into a gelled material which issues by way of an axial outlet orifice at a pressure which is insufficient to overcome the resistance to flow of a narrow outlet orifice and consequently at a rate of flow which is insufficient for production on an industrial scale. There is above all a danger of decomposition of the gelled material owing to excessive heating consequent to its excessively slow passage through the extruder.

This is why attempts have been made to increase the flow by means of a short screw of conventional type (archimedes screw) which is rotated at high speed and results in a pressure of the gelled material which is sufficient to ensure expulsion at industrial rates of flow through the outlet die. However, such a screw does not give the desired results.

The Applicant has found that the poor results obtained appear to be due to a poor flow of the material in the zone of passage from the plate-type extruder to the conveyor screw, so that the screw, which is designed for high rates of flow, is insufficiently supplied with material.

The object of the invention is to provide a screw of the aforementioned short type adapted to be mounted in the axial extension of a plate-type extruder so as to convey and compress the gelled material issuing from the extruder, this screw being so improved as to remedy the aforementioned drawback and overcome the resistance to flow of an extrusion die having a high pressure drop across its orifice, in particular a narrow die.

The invention provides a screw adapted to be mounted inside a sleeve at the outlet end of an extruder, said screw comprising at least one thread which starts, at the root of the screw, in the form of an arcuate spade portion and has adjacent said spade portion in a first portion of its length a section having a concave crest, the rest of the thread following on said first portion having a section which has a conventional rectilinear crest parallel to the axis of the screw.

Owing to this spade-shaped portion of the thread of the screw at its root, the screw is supplied with material in a correct and sufficient manner to ensure an industrial rate of flow through an extrusion die having a high pressure drop across its orifice.

Consequently, the rate of flow of the gelled material is markedly increased and becomes sufficient for production on an industrial scale and, moreover, the flow can be maintained constant and regular and the passage of the material through the extruder is at a rate which is high enough to avoid over heating so that the material produced is sound.

Another object of the invention is to provide an extruding device which comprises a plate-type extruder whose airgap communicates through a convergent connection zone having a convex section with an axial cylindrical sleeve followed by an extrusion die, and a screw rotatable in said sleeve, wherein said screw comprises at least one thread which starts at the root of the screw, near the rotating plate of the extruder, in the form of an arcuate spade portion and has adjacent said spade portion in a first portion of its length a section having a concave crest which matches the convex shape of said convergent connection zone, the rest of the thread following on said first portion having a section which has a conventional rectilinear crest parallel to the axis of the screw.

Further features and advantages of the invention will be apparent from the ensuing description with reference to the accompanying drawings.

In the drawings:

FIG. 1 is a diagrammatic sectional view of a plate-type extruder according to the invention;

FIG. 2 is partial perspective view, on an enlarged scale, of the screw of said extruder;

Figure 4:
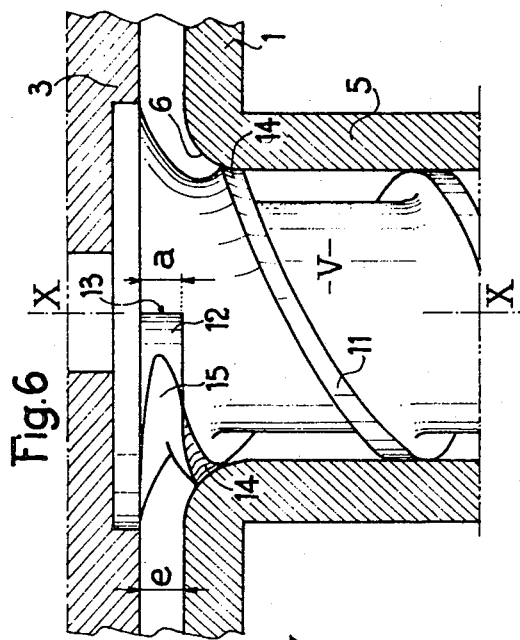
FIG. 4 is a sectional view of the screw taken along line 4—4 of FIG. 3.
Figure 5:
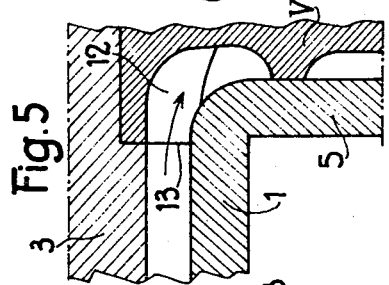
FIG. 5 is a diagrammatic sectional view of a detail of the device shown in FIG. 3.
Figure 3:
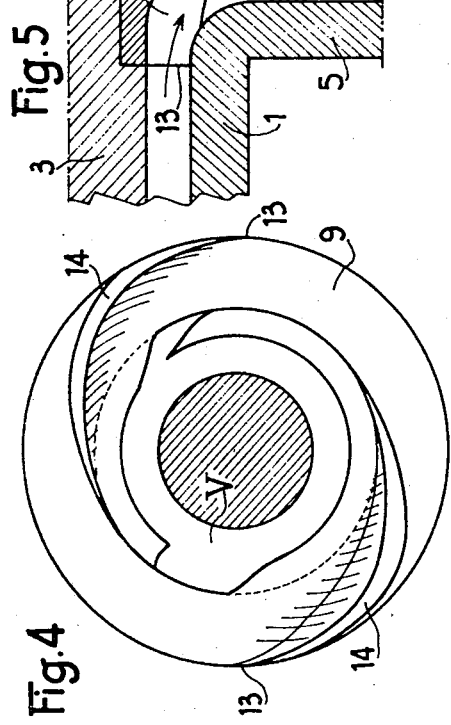
FIG. 3 is a partial sectional view corresponding to FIG. 1 on an enlarged scale of the connection zone between the airgap of the plate-type extruder and the screw.

In the embodiment shown in FIGS. 1–6, the invention is applied to an extruder B having a cylindrical dish-shaped body 1 having a vertical axis X—X. Formed on the cylindrical wall of the body is a part for a hopper 2 supplying the material to be extruded. This hopper is arranged in such manner that the material poured therein flows in a direction parallel to the axis X—X and opens onto the face of the bottom of the body 1 at a distance from the bottom. Rotatable in the cylindrical cavity of the body 1 in the direction of arrow $f$ is a rotor 3 driven by a shaft 4 having an axis of rotation coinciding with the axis X—X. A motor (not shown) drives the shaft 4. The bottom of the body 1 and the rotor 3 constitute the two plates of the extruder E.

The body 1 is axially extended by a cylindrical sleeve 5 which contains a screw V. The sleeve 5 has, internally and in its upper part, a zone 6 constituting a convergent connection zone which has a convex section and connects the bottom of the body or stator 1 to the cylindrical cavity in which the screw V is disposed. The cylindrical sleeve 5 terminates at its lower end in an extruding die 7 including for example a core 8.

The screw V has a shape suitable for conveying and compressing the material gelled by the extruder E. Therefore, it is much shorter than extruding screws of which it has only the end portion for conveying and compressing the material. This screw is mounted on the rotor 3, for example by means of a centering plate 9 and a square portion 10, for transmitting the drive. The screw V has threads 11 having a substantially trapezoidal cross section which matches or marries up with the face of the cylindrical cavity of the sleeve 5. There are for example two threads.

Each thread 11 at the root of the screw near the rotor 3 starts with a cylindrical spade portion 12 whose width $a$ (FIG. 6), measured in the direction parallel to the axis X—X, is equal to that of the connection zone between the airgap $e$ (space between the plates 1 and 3) and the cavity of the sleeve 5. The spade portion 12 has an edge 13 which is normal to the surface of the stator and of the rotor 3 and serves to remove or scoop the gelled material. Perpendicular to the edge 13, the spade portion 12 has a helical edge 14 which constitutes the start of a thread 11. This helical edge 14 has a concave cross-sectional shape which matches that of the convex and convergent face 6 of the body 1 and forms progressively, in a first portion of the thread, the crest of the section of this thread. The first portion of the thread 11 having a concave crest is progressively converted into a thread having a trapezoidal section with a rectilinear crest parallel to the axis X—X. The thread retains this section throughout the rest of its length.

Figure 6:
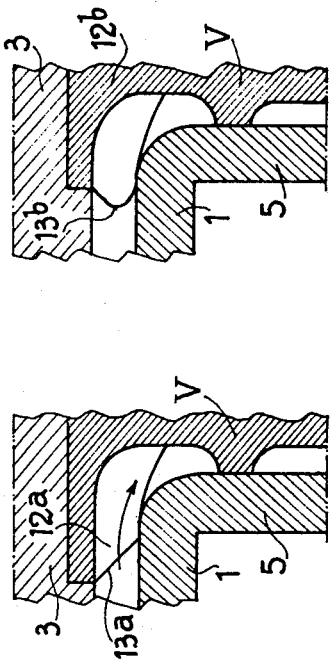
FIG. 6 is a view similar to FIG. 3, the screw being in another position relative to the sleeve.

Each cylindrical spade portion 12 is extended by a helical groove 15 which extends completely round the screw (see FIGS. 2 and 6 in respect of the helical edge 14).

The screw V terminates for example in a pointed portion 16 (FIG. 1) in the zone of the extruding die 7 in the known manner.

It will be understood that the extruder E and the screw include the conventional heating and cooling means (not shown).

The device operates in the following manner:

The rotor 3 is rotated in the direction of arrow $f$. The material to be extruded, for example rigid polyvinyl chloride in the form of grains or powder, is supplied to the airgap E by the hopper 2. The plastics material is frictionally engaged between the plates 1 and 3, driven in the direction from the periphery towards the center, softened by the heat and gelled when it arrives in the connection zone 6 leading to the cavity of the sleeve 5. In this zone the material is scooped by the edge 13 of each spade portion 12 and introduced in the helical groove 15 extending from the other edge 13 of the screw V. The plastics material is thus trapped in the helical grooves 15 and is conveyed by the screw to the extruding die 7 from which it issues in the form of a tubular blank or parison.

Note that owing to the spade portions 12, the width $a$ of each spade portion and the concave shape of the helical edge 14 of the spade portion which constitutes the crest of the starts of the threads 11, the plastics material encountered by the spade portions 12 is rapidly conveyed to the helical grooves 15 of the screw with no possibility of flowing back in the upstream direction, that is, towards the plates 1 and 3. Indeed, by matching the convex and convergent face 6 of the sleeve 5 and owing to its cylindrical shape, each spade portion 12 partly closes the zone of passage from the airgap $e$ to the helical groove 15 which precedes the edge in the direction of rotation of the screw and removes a large amount of the material in the airgap.

The screw V is consequently capable of supplying the plastics material at a rate of flow and at a pressure which are much higher than the rates of flow and pressures of screws of conventional type, the pressure being capable of reaching 2–300 bars, notwithstanding the narrow passage of the extruding die 7. The rate of flow and the pressure are also much higher than those of plate-type extruders which are not equipped with such a screw. Thus, as compared to a given plate-type extruder, the rate of flow is ten times higher, it varying, for an available 15 HP (French), between 60 and 90 kg/hour, depending on the section of the annular space between the screw and the sleeve 5 and the speed of rotation of the rotor 3 and screw. By way of comparison, no tubular blank can be obtained in a suitable manner with a screw of conventional type mounted in the extension of a plate-type extruder E which is devoid of the spade portions 12.

In respect of more powerful and larger extruders equipped with the screw according to the invention, the rates of flow may be much higher, of the order of several hundreds of kilograms/hour, with pressures as much as 200–300 bars or more.

The invention is applicable to the production of solid blanks or rings and tubular blanks of different sections to be subsequently put into the required shape.

Figure 7:
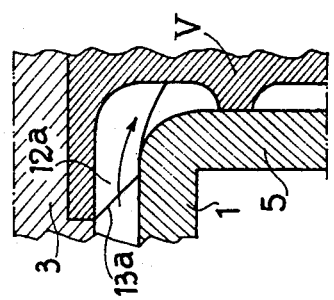
FIGS. 7 and 8 are views similar to FIG. 5 of two modifications of the invention.

According to a modification shown in FIG. 7, instead of having a cylindrical shape, the spade portion 12$a$ has a conical shape and terminates in an oblique edge 13$a$. This arrangement enables the plastics material to be scooped or taken further from the axis X—X in the airgap, between the rotor 3 and the stator 1 without excessively spreading the part of the sleeve 5 which adjoins the body 1.

Figure 8:
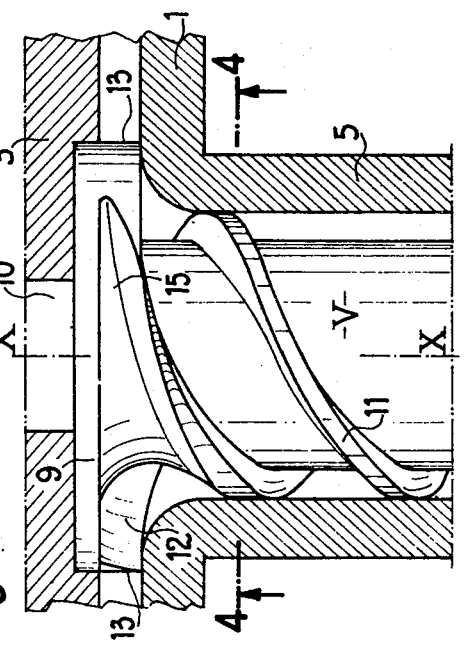

According to another modification shown in FIG. 8, instead of having an edge 13 normal to the plate of the stator 1, a cylindrical spade portion 12$b$ can have a curved convex edge 13$b$ so as to scoop the gelled material more efficiently.

It must be understood that the invention is also applicable to an extruder E having a horizontal axis X—X. It is also applicable to the case where the screw B is rotated independently of the rotor 3 and can consequently be driven at a speed which differs from the speed of rotation of the rotor and even in the opposite direction.

Having now described my invention what I claim and desire to secure by Letters Patent is:

1. An extruding device comprising an extruder having a stator, a rotor plate rotatable relative to said stator about an axis, an airgap between said plate and said stator, a cylindrical sleeve having an axis extending along said axis of rotation and an end portion integral with said stator, an extruding die combined with a portion of said sleeve remote from said end portion, a convergent connection zone having a peripheral convex inner face putting said airgap in communication with said sleeve, and a rotary screw disposed in and coaxial with said sleeve and defining an annular space with said sleeve, said screw comprising at least one screwthread which starts, at the root of said screwthread adjacent said plate, in the form of an arcuate spade portion and has in a portion of the screwthread adjacent said spade portion a cross-sectional shape having a concave crest which matches and engages said convex face of said convergent connection zone, the rest of the screwthread following on said first portion having a cross-sectional shape which has a conventional rectilinear crest parallel to the axis of said sleeve.

2. An extruding device as claimed in claim 1, wherein the width of the cylindrical spade portion of said screwthread is equal to that of the connection zone between said airgap and said annular space.

3. An extruding device as claimed in claim 1, wherein said spade portion has a part-cylindrical shape coaxial with said axis and has an edge for scooping gelled material to be extruded, said edge being parallel to said axis.

4. An extruding device as claimed in claim 1, wherein said spade portion has a part-conical shape and an edge for scooping gelled material to be extruded, said edge being oblique relative to said axis.

5. An extruding device as claimed in claim 1, wherein said spade portion has an edge in the form of a convex curve.

* * * * *